United States Patent [19]

Perego

[11] Patent Number: 5,749,627
[45] Date of Patent: May 12, 1998

[54] PUSHCHAIR WITH BACKREST ADJUSTMENT BY CENTRALIZED CONTROL

[75] Inventor: Gianluca Perego, Arcore, Italy

[73] Assignee: Peg Perego Pines S.p.A., Arcore, Italy

[21] Appl. No.: 345,625

[22] Filed: Nov. 28, 1994

[30] Foreign Application Priority Data

Nov. 29, 1993 [IT] Italy .................. MI930929 U

[51] Int. Cl.⁶ ........................................ B60N 2/20
[52] U.S. Cl. .............. 297/370; 297/44; 297/366; 280/647; 292/265
[58] Field of Search ................ 297/370, 371, 297/44, 366; 292/225, 266, 265

[56] References Cited

U.S. PATENT DOCUMENTS

| 1,327,754 | 1/1920 | Cade | 292/265 |
|---|---|---|---|
| 1,520,222 | 12/1924 | Brown | 297/370 X |
| 2,000,471 | 5/1935 | Moore | 297/370 X |
| 2,171,251 | 8/1939 | Capron | 297/370 |
| 2,369,725 | 2/1945 | Dyrr | 292/266 X |
| 2,755,853 | 7/1956 | Carlson | 297/366 X |
| 4,216,974 | 8/1980 | Kassai | 280/42 |
| 4,487,453 | 12/1984 | Emmerich et al. | 297/366 X |
| 4,538,830 | 9/1985 | Nakao et al. | 280/647 |
| 4,561,694 | 12/1985 | Mouri et al. | 297/370 X |
| 4,618,184 | 10/1986 | Harvey | 297/354.12 X |
| 5,217,239 | 6/1993 | Koet | 280/647 X |
| 5,246,272 | 9/1993 | Kato et al. | 297/354.12 X |
| 5,294,141 | 3/1994 | Mentessi et al. | 297/354.12 X |
| 5,472,224 | 12/1995 | Cabagnero | 290/642 |

FOREIGN PATENT DOCUMENTS

| 495839 | 9/1953 | Canada | 292/265 |
|---|---|---|---|
| 0494701 | 7/1992 | European Pat. Off. | 280/642 |
| 430068 | 6/1926 | Germany | 292/265 |
| 20497 B/88 | 1/1988 | Italy . | |
| 297371 | 11/1989 | Japan | 280/647 |

*Primary Examiner*—Peter M. Cuomo
*Assistant Examiner*—David E. Allred
*Attorney, Agent, or Firm*—McGlew and Tuttle

[57] ABSTRACT

A pushchair comprises a frame onto which is hinged a reclinable backrest (24). On opposing sides of the reclinable backrest (24) the frame supports arms (20) pivotally rotatable in a vertical plane between a first position and a second position. Each arm (20) comprises a plurality of engaging notches (19) disposed along a path (23) along which slide pins (18) protruding laterally from the backrest (24). In the first position each arm (20) engages with one of the notches (19) the corresponding pin (18) protruding from the backrest, so as to block the movement of the backrest in a pre-established angular position and in the second position disengages the notches (19) of the plurality from the pin (18) to allow free movement of the backrest. Disposed on the backrest is a manual control to engage the arms (20) and move them simultaneously between the first and the second position.

18 Claims, 3 Drawing Sheets

PUSHCHAIR WITH BACKREST ADJUSTMENT BY CENTRALIZED CONTROL

FIELD OF THE INVENTION

This invention refers to a pushchair with a reclinable backrest having a centralized device for releasing and adjusting its angle of inclination.

In particular, the pushchair is of the type known as a pushchair which folds up "umbrella fashion", that is to say with a folding movement in both a lengthwise and crosswise direction, by suitable articulation of the frame.

BACKGROUND OF THE INVENTION

A known pushchair of this kind is for example the one described in the Italian Utility Model patent N° 213.692 on behalf of the same Applicant, to which the reader is referred for further details. The aforesaid pushchair is provided with a backrest foldable in a crosswise direction by means of a plurality of arms articulated in the form of a parallelogram. The backrest is moreover angularly reclinable in a plurality of positions by engagement of one of its pairs of lateral teeth in a plurality of notches made in movable arms situated longitudinally on each side of the pushchair itself.

The backrest is adjusted by manually lifting the two movable arms so as to simultaneously release the teeth from their respective notches and fitting them into the notches corresponding to the desired new position. This obviously involves the need to use both hands and bend down to the height at which the aforesaid mechanisms are located. These operations are not always easy to carry out, especially whenever one hand is occupied holding a bag or the baby itself.

SUMMARY OF THE INVENTION

The general scope of this invention is to obviate the aforementioned problems by providing a pushchair with backrest adjustment by centralized control, which makes it possible to carry out the operations of locking/releasing and adjusting the angle of inclination of the backrest with one hand and without bending.

This scope is achieved, according to the invention, by providing a pushchair comprising a frame onto which is hinged a reclinable backrest, the frame supporting arms on opposing sides of the reclinable backrest which are pivotally rotatable in a vertical plane between a first position and a second position, each arm comprising a plurality of engaging notches disposed along a path along which slide pins protruding laterally from the backrest, in the first position each arm engaging with one of the notches the corresponding pin protruding from the backrest, so as to block the movement of the backrest in a pre-established angular position, and in the second position disengaging the notches of the plurality from the pin to allow free movement of the backrest, characterized by the fact that disposed on the backrest are means which have a manual control element to engage the arms and move them simultaneously between the first and the second position.

BRIEF DESCRIPTION OF THE DRAWINGS

The innovative principles of this invention and its advantages compared to the known technique will be more clearly evident from the following description of a possible exemplificative embodiment applying such principles, with reference to the accompanying drawings, in which.

DETAILED DESCRIPTION OF THE INVENTION

Figure 1:
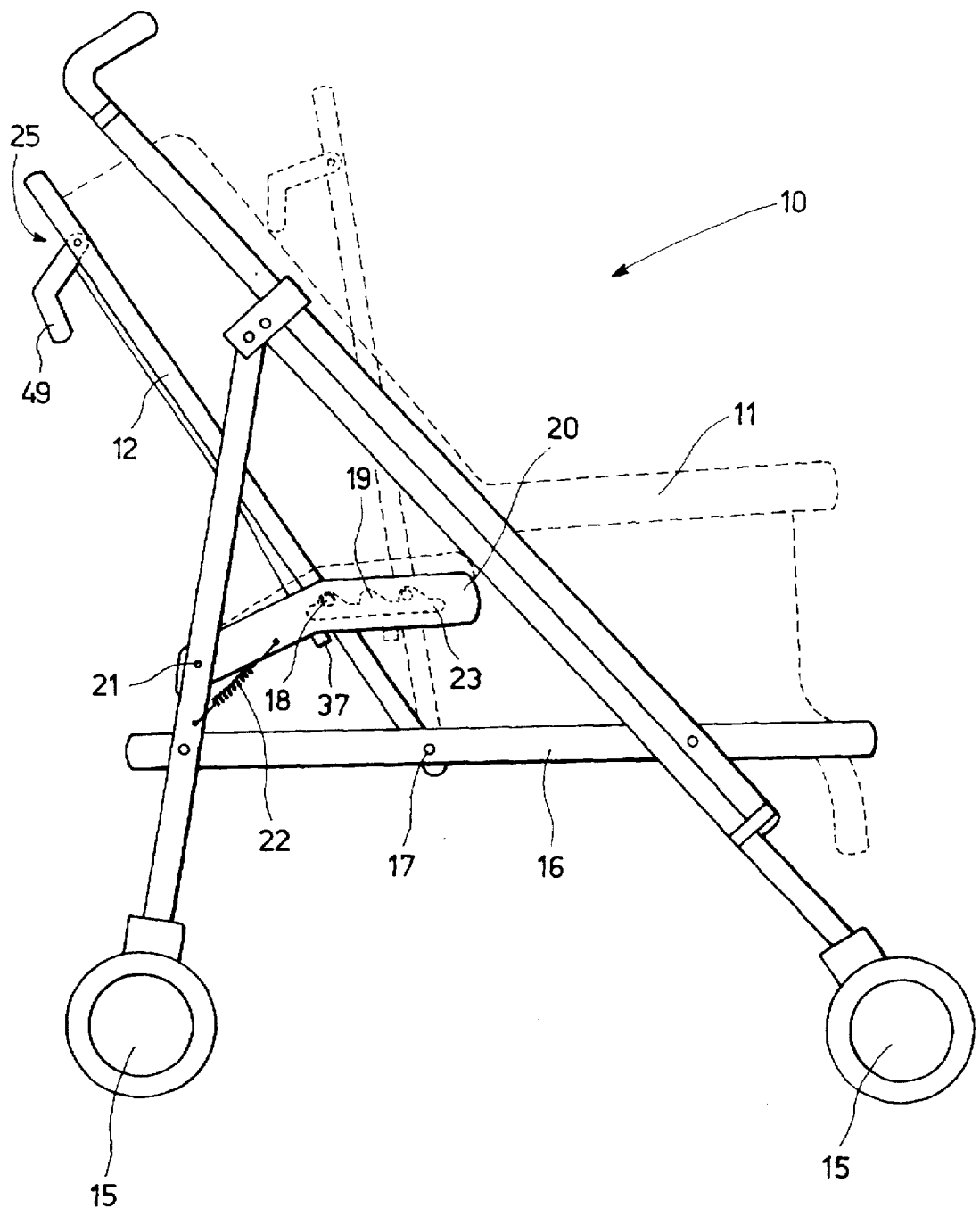
FIG. 1 shows a schematic side view of a pushchair with backrest adjustment according to the invention.

With reference to the figures, FIG. 1 schematically shows a pushchair 10 with a foldable frame substantially of the known type, for example of the type described in the aforementioned IT patent 213.692. According to the known technique, the pushchair is composed of a hinged frame inferiorly comprising pivoting wheels 15 and supporting a child's chair 11, indicated by a broken line to clarify the drawing.

The chair 11 has a backrest 12 hinged to the frame, by means of a pin 17, so as to be angularly adjusted around the axis of the pin 17 between a raised position (shown by the broken line in FIG. 1 and a reclined position (shown by the continuous line).

Two specular arms 20 are hinged to pins 21 on either side of the frame. Each arm 20 has a slot 23 along which slides a respective engaging pin 18 protruding laterally from the backrest 12. Each slot 23 is superiorly provided with a series of notches 19 which receive the pins 18 to ensure angular blockage of the movement of the backrest 12. To maintain the pin and the notch firmly engaged each arm 20 has a tension spring 22 which pulls the arm downwards.

Advantageously, the notches 19 are shaped tapering towards the forward direction of the pushchair, so that the movement of the backrest towards the most upright position can be achieved simply by traction on the backrest. To recline the backrest it is necessary to simultaneously raise the two arms 20 against the action of the springs 22 from the position shown by the continuous line to the position shown by the broken line in FIG. 1, so as to disengage the respective pins 18 from the notches 19, to allow them to slide along the slot 23.

According to the innovative principles of this invention, the movement of disengaging the arms 20 is achieved by means of a centralized control device, which can be advantageously used also in the case of a pushchair which folds up either lengthwise or crosswise.

Figure 2:
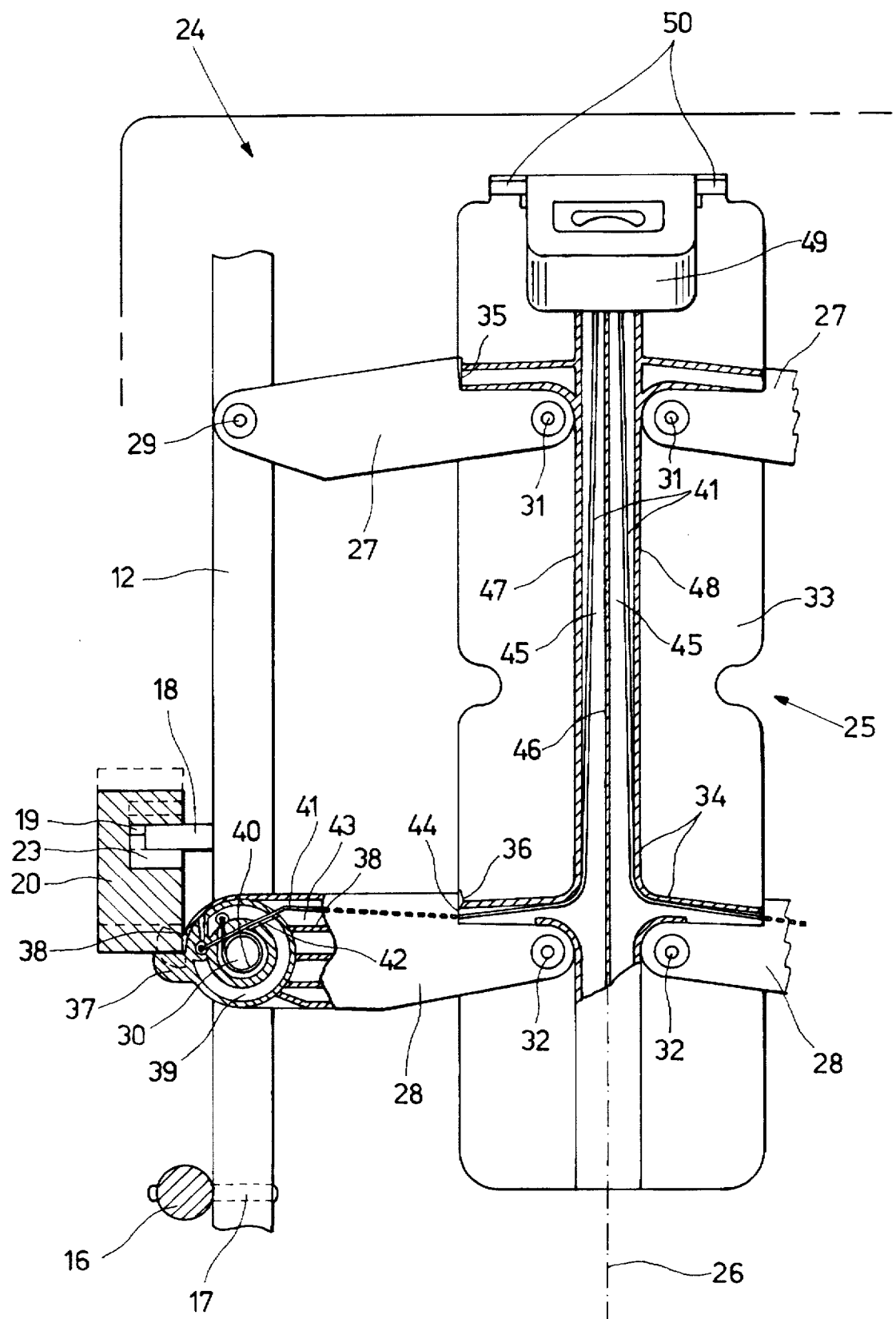
FIG. 2 shows a partial cutaway front scrap view of the articulation of the backrest in the open position and of the control mechanism according to the invention.

FIG. 2 schematically shows the backrest 24; and the backrest is shown only partially, since it is symmetric with respect to the axis 26.

As can be clearly seen in FIG. 2, according to this invention simultaneous raising of the arms 20 is achieved, for each arm, by means of an element 39 which is movable on command to engage the corresponding arm 20 and shift it from the lowered position to the raised position (as indicated by the broken line in FIG. 2. The simultaneous movement of the two elements 39 is controlled, by means of a kinematic link, by operating a single handle 49 advantageously disposed close to the top of the backrest. Advantageously, the element 39 is composed of a disk, rotatingly pivoted to the backrest pin 30 and having a finger 37 protruding radially so as to fit under the corresponding arm 20.

Connected, decentralized, to the disc 39 is a tie 41, for example a flexible steel cable and the tie 41 is, connected at the other end to the handle 49.

When the handle 49 is raised, the ties 41 are pulled thereby causing rotation of the respective disks 39 (in a clockwise direction for the disk 39 in FIG. 2) against the action of a spring contained in each disk, so as to raise the arms 20 and allow free inclination of the backrest.

When the handle is released, the springs 40 return the disks to the rest position and the arms 20 are lowered again to engage the backrest in its new angular position As mentioned previously, the pushchair is advantageously of the type which folds up "umbrella-fashion". In this case, the backrest comprises a crosswise-folding articulated structure. In particular, the articulating device comprises, in each of its symmetric halves with respect to the axis 26, a lateral upright 12 inferiorly pivoted to the rod 16 of the pushchair frame by means of the pin 17, as seen previously, so as to be able to rotate around the axis of the pin 17. An upper articulating arm 27 and a lower articulating arm 28 are pivoted to the upright 12, in an intermediate position, at one of their ends 29, 30. The articulating arms 27, 28 are further pivoted, at their other end 31, 32, to a substantially plate-shaped central element 33 provided with stiffening ribs 34. The assembly composed of the central plate 33, the two lateral uprights 12 and the pairs of upper arms 27 and lower arms 28 consequently forms a double articulated parallelogram in the backrest which is collapsible in a crosswise direction to the pushchair.

In this embodiment, each disk 39 has a journal coinciding with the pin 30 of the lower articulating arm. The control handle 49 is supported on the upper end of the central plate 33 by means of a pin 50. Both the plate 33 and the arms 28 have grooves or housings, 45 and 43 respectively, forming protective slide guides for the cables 41. The grooves 45 and 43 can be advantageously made in stiffening ribs on the plate and arms, for example moulded from plastic.

The cable 41 is accompanied, in a substantially radial direction towards the outer edge of the disk 39 to protrude from the latter, by a rib 42 which extends in the same direction. The rib 42, together with the line joining the pins 30, 32, forms such an angle that upon maximum rotation of the disk 39 (that is to say when the finger 37 engages the striking edge 38) the outer end of the same rib does not exceed in a clockwise direction the rib 38 which delimits the upper cavity 43 in which the cable 41 can move.

Figure 3:
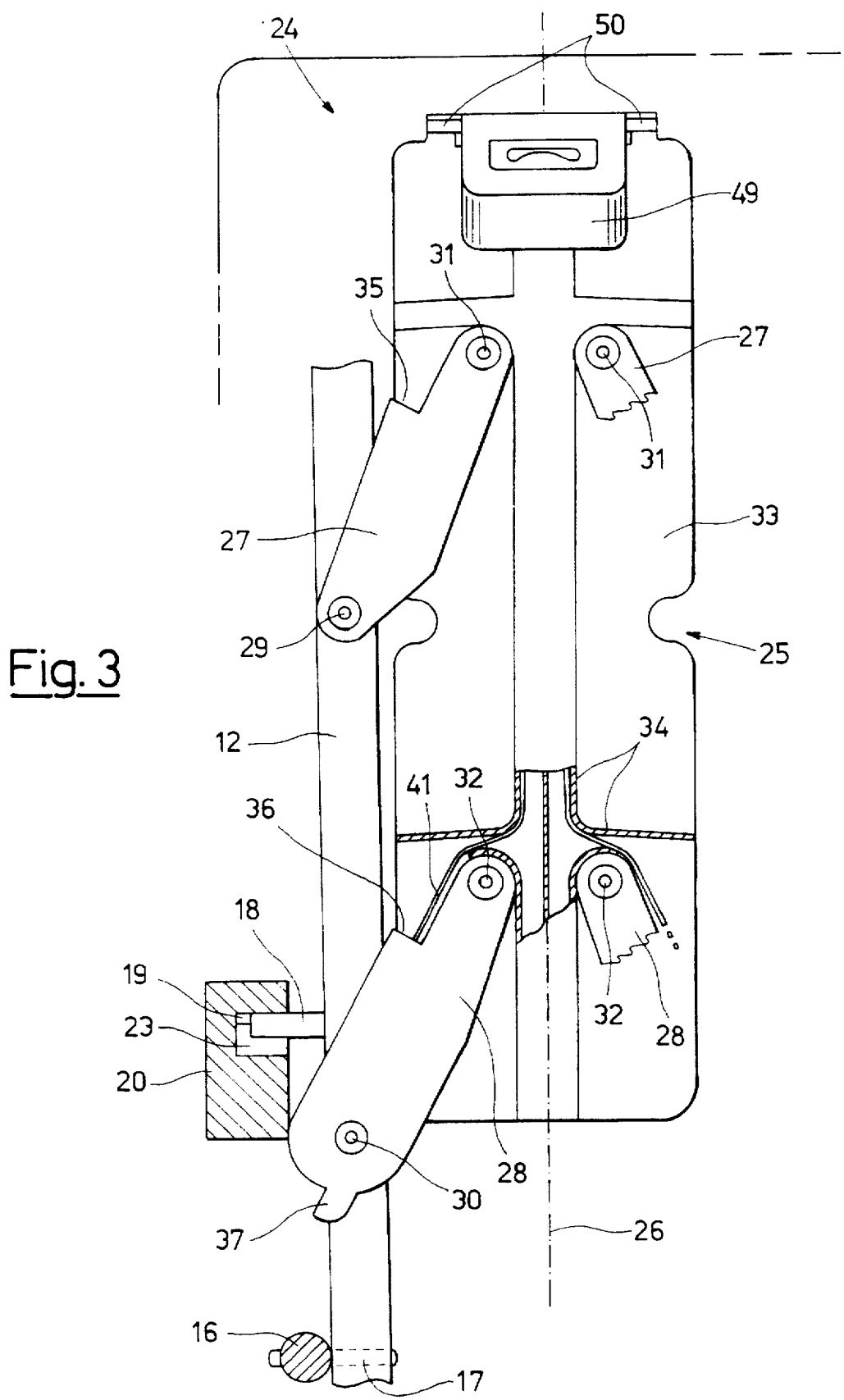
FIG. 3 shows a view similar to that of FIG. 2, but with the articulation in the folded position.

In the structure of the arm 28, situated at the end of the cavity opposite the disk 39, is a hole 44 which enables the cable 41 to enter the groove 45 in the central plate 33. As can be seen in FIG. 2 and FIG. 3, the cable 41 and its counterpart in the right-hand half, not shown in the figure, extend along two cavities 45, 45' delimited by the central ribs 46, 47, 48 to the control handle 49 disposed at the upper end of the plate 33, and pivoted by means of the pin 50. The cables 41 are secured to the handle by a known technique so as to enable them to be pulled upwards whenever the handle is raised by the operator.

When the pushchair, and consequently the backrest 24, is open, the articulating device 25 assumes the shape of FIG. 2 in which the striking surfaces 35, 36 of the arms 27, 28 engage with the sides of the plate 33 to prevent further aperture, while upon closure of the pushchair (FIG. 3) the arms 27, 28 rotate around their ends 31, 32, accompanying the lateral uprights 12 close to the plate 33 and the cables 41 follow the movement of the arms 28 without interfering.

At this point it will be clear that the intended scope is achieved by providing a pushchair with a backrest that can be shifted in position in an extremely simple and practical way, which is also compatible with structures that fold up "umbrella-fashion".

To lower or raise the backrest of the pushchair, it is sufficient to lift the handle 49 located in an easily accessible position on the upper part of the pushchair itself, so as to simultaneously raise the coupling arms 20. At this point the backrest can be lowered or raised to the desired position; after which, by releasing the handle 49, the fingers 37 are lowered by the returning action of the springs 40 no longer stressed by traction of the cables 41, thereby allowing the arms 20 to descend and once again engage the teeth 18 in the locked position. The foregoing description of an embodiment applying the innovative principles of this invention is obviously given by way of example in order to illustrate such innovative principles and should not therefore be understood as a limitation to the sphere of the invention claimed herein. For example, the shape of the frame and kinematic folding mechanisms can differ from those schematically shown, to adapt to particular requirements of use or manufacture.

What is claimed is:

1. Pushchair comprising a frame onto which is hinged a reclinable backrest, the frame supporting arms on opposing sides of the reclinable backrest, said arms pivotally rotatable in a vertical plane between a first position and a second position, each arm comprising a plurality of engaging notches disposed alone a path along which slide pins protruding laterally from the backrest, in the first position each arm engaging with one of the notches the corresponding pin protruding from the backrest, so as to block the movement of the backrest in a pre-established angular position, and in the second position disengaging the notches of the plurality from the pin to allow free movement of the backrest, disposed on the backrest is engaging means which has a manual control element directly mounted on said backrest to engage the arms and move them simultaneously between the first and the second positions;

the engaging means comprises a movable element disposed on the backrest close to each arm, each movable element having a kinematic link with the control element to shift, upon operation of the control element, between a first position of non-interference with a corresponding said arm and a second position of interference of the movable element with said corresponding arm in which said movable element biases the corresponding arm towards a corresponding said second position of said corresponding arm.

2. Pushchair as claimed in claim 1, wherein:

the first position of the arm is a lowered position and the second position is a raised position, the movement between the first and second position occurring against the action of a spring, said spring being connected to said frame and said arm.

3. Pushchair as claimed in claim 1, wherein:

each movable element is composed of a tooth protruding from an element pivoted to the backrest so as to rotate on command of the control element, the positions of interference and non-interference being angular positions of the pivoted element.

4. Pushchair as claimed in claim 1, wherein:

the kinematic link comprises a tie connected between the movable element and the control element.

5. Pushchair as claimed in claim 4, wherein:

the tie is a flexible cable.

6. Pushchair as claimed in claim 4, wherein:

the control element is a handle pivoted to the backrest so as to move between a rest position and a tie pulling position.

7. Pushchair as claimed in claim 1, wherein:

the movement of the movable element between the first position of non-interference and the second position of interference occurs against the action of a spring.

8. Pushchair as claimed in claim 1, wherein:

the backrest can be folded.

9. Pushchair as claimed in claim 8, wherein:

the backrest comprises a central body supporting the control element and connected to lateral uprights of the backrest by means of pairs of arms hinged so as to form a double parallelogram for folding of the backrest.

10. Pushchair as claimed in claim 1, wherein:

the movable elements are each disposed between one of the arms and the corresponding upright of said backrest.

11. Pushchair as claimed in claim 6, wherein:

the cable runs through a housing of said backrest.

12. Pushchair as claimed in claim 10, wherein:

the backrest comprises a central body, the cable runs through a housing made in the central body and through said movable element.

13. A pushchair comprising:

a frame;

a backrest pivotally connected to said frame;

first and second arms pivotally connected to said frame and movable between a first position and a second position, said arms being positioned on substantially opposite sides of said backrest, said arms defining a plurality of engaging notches;

first and second engaging pins positioned on said backrest and cooperating with said first and second arms respectively, said engaging pins engaging with said engaging notches in said first position to block movement of said backrest relative to said frame, said engaging pins disengaging with said engaging notches in said second position;

single engaging means mounted directly on said backrest and for simultaneously moving said arms between said first and second positions;

said engaging means directly moves said arms simultaneously from said first position to said second position;

spring means acting directly on said first and second arms to continuously bias said first and second arms toward said first position.

14. A pushchair in accordance with claim 13, wherein:

said backrest is foldable.

15. A pushchair in accordance with claim 13, wherein:

said frame includes legs;

said first and second arms are pivotally connected to said legs.

16. A pushchair in accordance with claim 13, wherein:

said frame includes legs;

said first and second arms are pivotally connected to a rear set of said legs.

17. Pushchair comprising a frame onto which is hinged a reclinable backrest, the frame supporting arms on opposing sides of the reclinable backrest, said arms pivotally rotatable in vertical planes between a first position and a second position, each arm comprising a plurality of engaging notches disposed along a path along which slide pins protruding laterally from the backrest, in the first position each arm engaging with one of the notches the corresponding pin protruding from the backrest, so as to block the movement of the backrest in a pre-established angular position, and in the second position disengaging the notches of the plurality from the pin to allow free movement of the backrest, disposed on the backrest are engaging means which have a manual control element to engage the arms and move them simultaneously between the first and the second position, the backrest comprises a central body supporting the control element and connected to lateral uprights of the backrest by means of pairs of arms hinged so as to form a double parallelogram for folding of the backrest.

18. A pushchair in accordance with claim 1, wherein:

said movable element is positioned on said backrest and adjacent said backrest independent of a position of said backrest.

* * * * *